(12) United States Patent
Berard et al.

(10) Patent No.: US 8,321,703 B2
(45) Date of Patent: Nov. 27, 2012

(54) POWER AWARE MEMORY ALLOCATION

(75) Inventors: Stephen R. Berard, Seattle, WA (US); Sean N. McGrane, Sammamish, WA (US); Bruce L. Worthington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/636,732

(22) Filed: Dec. 12, 2009

(65) Prior Publication Data

US 2011/0145609 A1    Jun. 16, 2011

(51) Int. Cl.
- G06F 1/32 (2006.01)
- G06F 1/00 (2006.01)
- G06F 13/00 (2006.01)

(52) U.S. Cl. .......... 713/320; 713/300; 711/147
(58) Field of Classification Search .......... 713/320
See application file for complete search history.

(56) References Cited

U.S. PATENT DOCUMENTS

| | | | |
|---|---|---|---|
| 6,760,818 B2 * | 7/2004 | van de Waerdt | 711/137 |
| 7,003,639 B2 | 2/2006 | Tsern et al. | |
| 7,437,579 B2 | 10/2008 | Jeddeloh et al. | |
| 7,587,559 B2 | 9/2009 | Brittain et al. | |
| 7,907,823 B2 * | 3/2011 | Jureczki et al. | 386/252 |
| 2005/0268064 A1 | 12/2005 | Cohen et al. | |
| 2008/0005531 A1 * | 1/2008 | Praca | 711/209 |
| 2009/0089491 A1 * | 4/2009 | Hatanaka et al. | 711/103 |
| 2009/0089531 A1 | 4/2009 | Johnson et al. | |
| 2009/0113162 A1 | 4/2009 | Di-Zenzo | |
| 2010/0070695 A1 * | 3/2010 | Baek et al. | 711/104 |

OTHER PUBLICATIONS

Catthoor, et al. "Global communication and memory optimizing transformations for low power signal processing systems", Retrieved at<<http://citeseerx.ist.psu.edu/viewdoc/download?doi=10.1.1.51.4413&rep=rep1&type=pdf>>, 1994, pp. 12.

"21 Tools to Optimize Your Computer Memory", Retrieved at<<http://www.gigglecomputer.com/2009/09/21-tools-to-optimize-your-computer.html>>, Sep. 20, 2009, pp. 1-11.

* cited by examiner

Primary Examiner — Suresh Suryawanshi
(74) Attorney, Agent, or Firm — Rau Patents, LLC (57) ABSTRACT

A computer system may place memory objects in specific memory physical regions based on energy consumption and performance or other policies. The system may have multiple memory regions at least some of which may be powered down or placed in a low power state during system operation. The memory object may be characterized in terms of access frequency, movability, and desired performance and placed in an appropriate memory region. In some cases, the memory object may be placed in a temporary memory region and later moved to a final memory region for long term placement. The policies may allow some processes to operate while consuming less energy, while other processes may be configured to maximize performance.

20 Claims, 6 Drawing Sheets

POWER AWARE MEMORY ALLOCATION

BACKGROUND

Computer energy consumption can be a large expense to datacenters and other operators of computer systems. Energy consumption is often coupled with cooling and other expenses within a datacenter, these multiply the operational costs. For example, computers that draw large amounts of power often have high cooling costs as well.

SUMMARY

A computer system may place memory objects in specific memory physical regions based on energy consumption and performance or other policies. The system may have multiple memory regions at least some of which may be powered down or placed in a low power state during system operation. The memory object may be characterized in terms of access frequency, movability, and desired performance and placed in an appropriate memory region. In some cases, the memory object may be placed in a temporary memory region and later moved to a final memory region for long term placement. The policies may allow some processes to operate while consuming less energy, while other processes may be configured to maximize performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A memory management system may place objects into memory by first characterizing the objects, then placing the objects into memory regions based on a policy that may identify a long-term or temporary memory region. The system may organize less frequently used memory objects into regions that may be operated in low power modes, and may place more frequently used memory objects into regions that may be operated in high power modes or that may have higher performance characteristics.

The memory management system may operate as an operating system function, and may use information about hardware topology, the usage of individual memory objects, input from applications, and other parameters to determine an optimized location for various memory objects. The optimization may be performed to maximize different parameters, such as energy savings, overall performance, performance for specific applications, performance for specific virtual machine instances, or other parameters.

Many memory devices may have different operating characteristics. In a typical volatile memory device, memory regions in a low power state may be used to maintain data in memory, and a high power state may be used to access the data using read or write commands. Typically, accessing such a device in a low power state may be done by raising the power state and performing the access. Such an access typically may have latency properties that affect the performance of the operation.

The memory management system may characterize a memory object based on the type of object, related processes, predefined characteristics, or usage history for the object. Other classification and characterization mechanisms may also be used.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
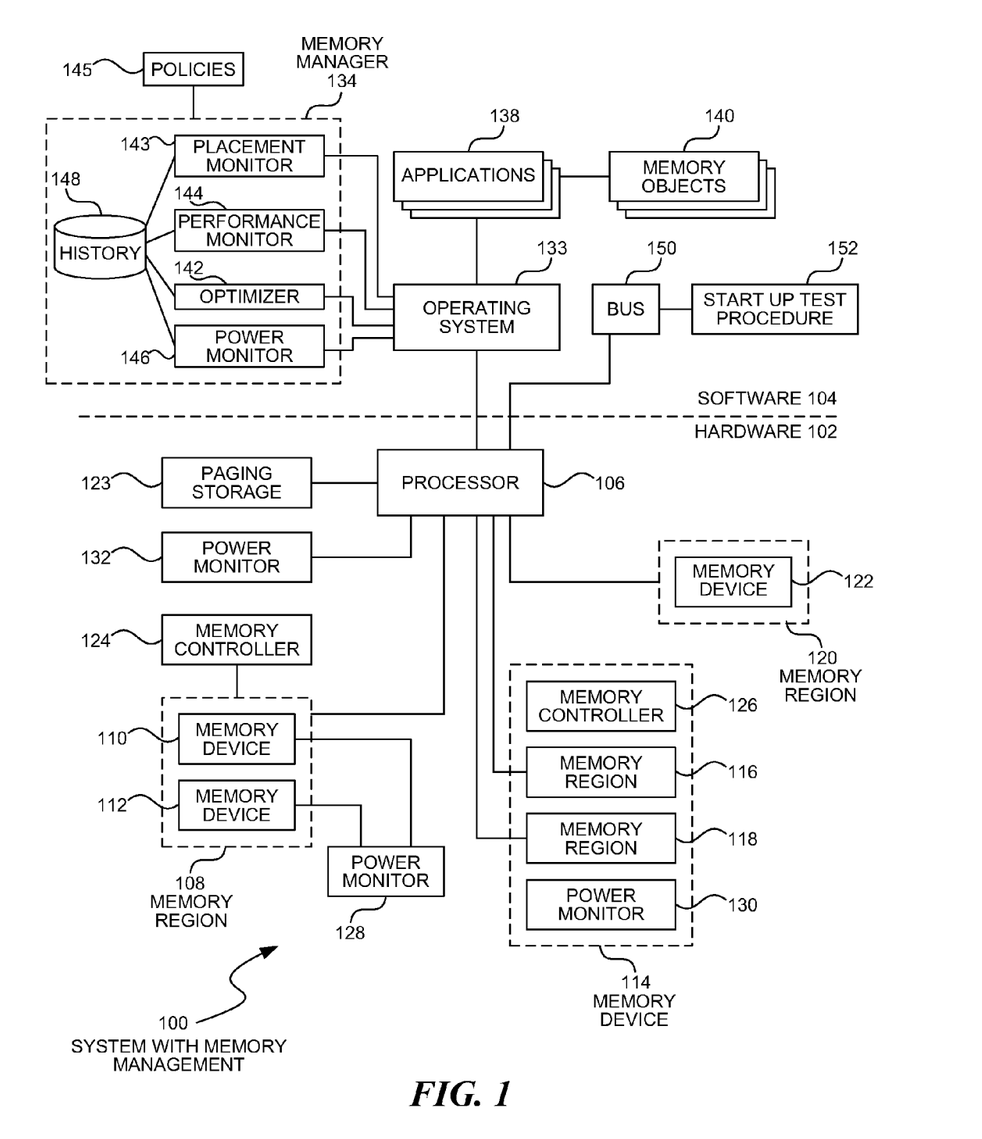
FIG. 1 is a diagram illustration of an embodiment showing a system with memory management.

FIG. 1 is a diagram of an embodiment 100 showing a system with a memory management system. Embodiment 100 is a simplified example of a computer system that may manage energy consumption by placing memory objects appropriately so that infrequently used memory objects may be consolidated to memory regions that may be operated in a low power state.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system that may manage memory objects to conserve energy and optimize performance. Embodiment 100 may represent any type of computing device that may have a processor and memory. Examples may include desktop computers, server computers, handheld computing devices, mobile telephones, personal digital assistants, or any other device that has a processor and memory.

Embodiment 100 may optimize power and performance by placing memory objects in memory regions that are appropriate for the memory object. Memory regions that are infrequently accessed may be operated in a low power state. In some cases, memory regions may be unused and thus empty. Memory objects may be consolidated so that objects that are frequently accessed may be stored in a high power region, and the memory objects may be moved from one region to another as the usage of the memory object changes.

Selecting an appropriate memory region for a memory object may take into consideration the anticipated usage pattern of the memory object, as well as the object type and other factors. In some cases, the memory object may be placed in a memory region on a temporary basis, with the anticipation that a later operation may move the memory object to another memory region at a later time.

A set of policies may be used to determine how memory objects may be placed in a device's memory. The policies may define logic for placing objects, and may include rules, heuristics, algorithms, statements, or other mechanisms for defining the logic.

Once the memory objects are placed in the various memory regions, an optimization mechanism may move certain memory objects from one memory region to another. A basic optimization routine may move objects in low power memory regions when those objects are accessed infrequently. More complex algorithms may use various levels of historical data, input from applications that create and use the memory objects, and monitoring of performance and energy consumption to find an optimized placement.

Figure 2:
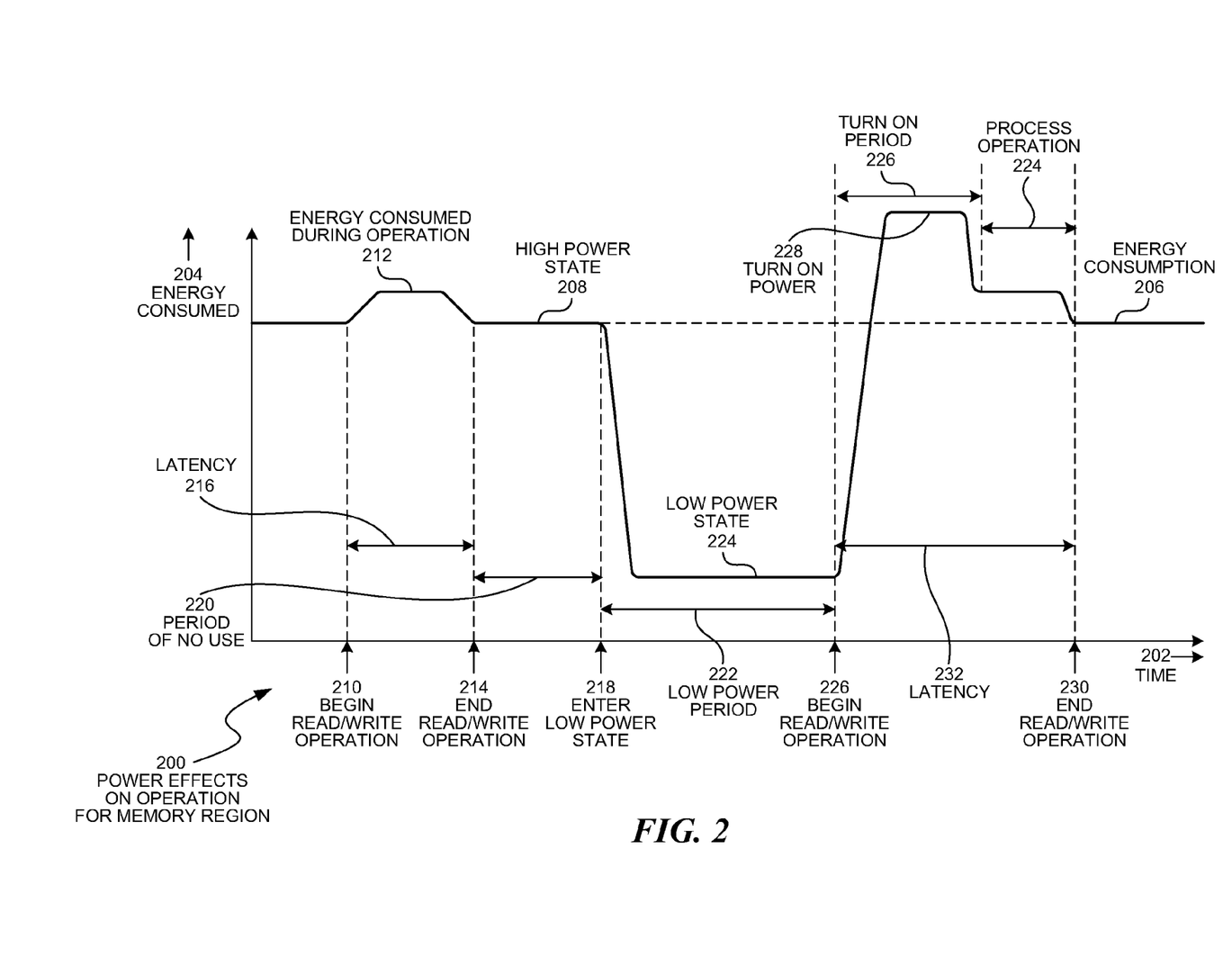
FIG. 2 is a diagram illustration of an embodiment showing a power curve over time for a memory device.

There are many different memory technologies, and each technology may have different characteristics. In general, many types of volatile memory may consume a small amount of energy to refresh the memory and may consume a higher amount of energy when a read or write operation is performed. Some memory technologies may have different energy impacts for read or write operations. In many memory technologies, the transition from low power state to high power state may cause some delay in responding to the request. Thus, a memory device operated at a low power state may consume less energy but may pay a performance price. A more detailed illustration of such an operation may be seen in embodiment 200 presented later in this specification.

In general, operating a memory device at a low power level may have an associated performance cost. In order to minimize the performance cost, those memory objects that are accessed infrequently or those that can tolerate a slower response time may be placed onto memory devices that may be operated at a low power level.

The memory management system may manage memory in several different ways and may use different optimization mechanisms, which may vary based on the associated applications, usage history, memory device types, or other factors. The memory management system may operate as an abstraction layer between the physical memory and virtual memory. In many cases, an operating system may provide such an abstraction.

The abstraction layer may allow the operating system to present a larger set of memory addresses to applications than what is physically available. The operating system may move memory objects back and forth between main memory and a memory cache, such as paging storage, to accomplish the larger memory storage.

Memory objects may be classified into several different types. For example, memory objects may be unmovable objects, paged memory objects, short term objects, long term objects, high frequency access objects, low frequency access objects, and other types of memory objects. The various types of memory objects may be placed in memory using different logic in different memory configurations.

Unmovable objects may be memory objects that are assigned to a peripheral device, subcomponent, application, or other memory consumer where the memory consumer may address the memory object directly. Unmovable objects may be used when the abstraction layer of a virtual address space is circumvented, and may be used when high speed access is desired for specific components.

For example, a video interface may be assigned a block of memory for direct access. The video interface may read and write to the block of memory without the abstraction layer of the operating system so that the video performance is maximized.

Unmovable objects may be designated as such because the operating system may not be capable of moving those objects to other memory regions. Specifically, the memory management system of the operating system may not be able to consolidate unmovable objects to certain memory regions so that other memory regions may be operated at low power or powered down completely.

When an application or device requests memory allocation for an unmovable memory object, a memory manager may identify those memory regions that will likely be operated in a similar manner as the unmovable memory object. Often, an unmovable memory object is created for performance reasons, so unmovable memory objects may be placed in high performance memory regions that may be generally operated in a high powered state.

In a typical embodiment, a memory manager may place unmovable memory objects together in the same memory region so that other memory regions may be available for moving memory objects and changing the memory region operating characteristics.

Paged memory objects are memory objects that have been moved to a paged storage and may be returned to random access memory for use. Typically, paged memory objects are objects that have pushed into paged storage to make room for other objects in random access memory.

A typical paged storage system may be a hard disk or other storage system that is accessible by the operating system. The paged storage may be slower to access than random access memory and may be used for freeing up random access memory.

Paged memory objects may be brought back into memory when the objects are accessed. An application may attempt to access the memory object, then the operating system may detect that the object is paged, then the operating system may bring the paged memory object back into random access memory for the application to access the object. The process of bringing the memory object back into random access memory may include determining an appropriate memory region for the object. For example, an object brought back into random access memory may be placed in a high frequency or low frequency access memory region based on the expected use of the object.

Paged memory objects may often be those memory objects that are infrequently accessed. A memory manager may identify infrequently accessed objects and move them into paged storage in a proactive manner, such as paging memory objects when those objects have not been accessed for a predetermined amount of time.

In other cases, the memory manager may move some objects to paging storage in a reactionary manner, such as when the random access memory is full and additional space is requested for new memory objects. In such cases, the memory objects moved to paging storage may not fit a classification of infrequently accessed memory objects and may in fact be frequently accessed memory objects.

A memory manager may select a memory region for a memory object based on the anticipated usage pattern of the memory object. In general, memory objects with high frequency access may be placed in memory regions that are operated in a high power state, while memory objects with low frequency access may be placed in memory regions that may be operated in a low power state.

In some situations, memory objects may be placed in a non-optimal memory region on a temporary basis. An optimization algorithm or policy may determine when such a placement may occur.

A temporary placement may include placing a known low frequency access memory object into a memory region operated at high power. Such a situation may occur when the memory object may have a pending access request and when low powered memory regions are either full or operated in a low power state, for example.

One scenario may be a memory object that is being returned from paged storage. Metadata about the memory object may indicate that the application or service requesting the memory object is at a low priority or operating in a background mode, for example. The metadata may indicate that the memory object will have a low anticipated usage frequency, but the request for the memory object indicates that the memory object will be placed in a memory region that is in a high power state so that the memory object may be accessed.

In the scenario, a memory placement system may determine that there may be sufficient free space in a high power memory location for the memory object and may place the memory object into the high power memory location on a temporary basis. Such a placement may be a temporary placement and the memory object may be returned to paged storage based on a paging policy, or moved to a low power region based on other memory management policies at a later time. The memory placement algorithm may mark the memory object as an object that may be moved to paged or low power memory regions for the next paging or memory optimization sweep. Such a mark may occur after the memory object has been accessed.

There may be many such scenarios that may be performed when placing memory objects into memory regions. In some embodiments, a heuristic or algorithm may be defined that has a set of rules or other logic that may guide a decision for identifying an appropriate placement. In some embodiments, an optimizing mechanism may identify several different placement options and may select an optimized option that considered performance, energy consumption, or other factors individually or collectively to determine an optimized placement.

After the memory objects may be placed in memory, a simple version of a memory management system may monitor blocks of memory to identify those that are frequently accessed and those that are less frequently accessed. Such a version may track a history of each unit of memory, such as a page of memory, and determine statistics that describe how frequently the memory block is being used. An optimization routine may attempt to place memory objects together based on their usage frequency to operate as many memory regions in low power mode as possible.

In versions that track a history of each unit of memory, the history may be removed or deleted when certain changes may be made to the memory device. For example, if a memory region is repurposed from a high usage to a low usage memory region, the history for that region may be deleted so that the history may not adversely affect the memory management algorithms. In another example, a new memory device that is added to a system may have its usage history purged.

The system of embodiment 100 may have a processor 106 and various memory regions, where each memory region is independently controllable to operate at different power states.

For the purposes of this specification and claims, a memory region is a portion of memory that is independently controllable to operate at different power states.

Many memory technologies are capable of operating at a low power state and a high power state, where a low power state is used to maintain or self-refresh the memory and a high power state is used to perform a read or write operation. In such memory technologies, the memory may exhibit higher performance at high power states and lower performance at lower power states. Other memory technologies may have additional power states that have different energy consumption and different performance characteristics.

The predominant performance characteristic of a memory state may be latency or the time between receiving a read or write request and the time the completion response is transmitted. In some embodiments, other performance characteristics may be considered during optimization, including bandwidth, access time, random read or write cycle time, page-mode read or write cycle time, time required to enter or exit low-power modes, and other performance characteristics.

In some embodiments, an optimization routine may use predefined performance characteristics for memory devices with which to calculate an optimized placement. In other embodiments, a performance monitor may periodically test or monitor performance so that actual performance values may be used.

Embodiment 100 illustrates several different configurations for memory regions. In some cases, a memory region may be made up of several memory devices. In other cases, a single device may have multiple memory regions, while in still other cases, one or more memory device may be treated as a single memory region.

The memory devices may be memory packages, such as DIP, SIPP, SIMM, DIMM, and other memory packages. Such packages may comprise a printed circuit board and one or more integrated circuits. In other embodiments, a memory device may be a single integrated circuit or a portion of an integrated circuit. Some memory devices may be easily removable by a user, such as a Universal Serial Bus memory device.

The memory devices may be any type of memory device, including volatile and nonvolatile memory devices. Volatile memory devices may maintain the memory contents as long as power is applied to the memory device. Nonvolatile memory may keep the memory contents even when power is removed from the device. Examples of volatile memory include Dynamic Random Access Memory (DRAM), Static Random Access Memory (SRAM), as well as other types of volatile memory. Examples of nonvolatile memory include flash memory, Electronically Erasable Programmable Read Only Memory (EEPROM), and various other types of nonvolatile memory.

The memory region 108 may comprise multiple memory devices 110 and 112. The memory devices 110 and 112 may be individual memory packages, for example. The memory device 114 may be a single device that comprises two memory regions 116 and 118. In another configuration, a memory region 120 may contain a single memory device 122.

In many computing devices, memory may be configured in a typically homogenous manner, meaning that there may be multiple memory regions that are identical or treated as identical in terms of performance. In many cases, such memory regions may be also configured to be identical in size.

In some computing devices, memory may include dissimilar memory devices or configurations. For example, a computing device may have several DRAM memory devices along with a flash memory device.

In some computing devices, two or more portions of memory may be combined in a striped or interleaved configuration. Interleaving or striping is a mechanism that may improve memory performance by using non-contiguous memory locations to store data in memory. In a typical interleaved memory application, two memory devices may be accessed by placing odd addresses on one memory device and even addresses on the second memory device. In many cases, interleaved memory may have faster response times or greater bandwidth that non-interleaved memory, especially for operations involving large amounts of data. In effect, the interleaving mechanism using two memory devices may increase throughput by increasing the bandwidth of data that may be processed by a memory system.

Such embodiments may identify some memory regions as high performance regions. For example, a system may be configured with two memory devices that are interleaved to form a single high performance memory region, while other memory devices may be configured without interleaving. The non-interleaved devices may be considered normal performance regions and used for processes that do not have high performance classifications.

When two or more memory devices or memory areas are interleaved at a fine granularity such that typical memory accesses will access multiple devices or areas, the grouping of interleaved devices or areas may be treated as a single memory region for controlling high power or low power states.

In some embodiments, two or more devices may be configured for interleaved memory operations while other memory devices may be configured as non-interleaved. In a typical desktop, laptop, or server computer, the memory configurations of a computer are set prior to bootstrapping the computer. In some devices, such configurations may be set at a Basic Input/Output System (BIOS) level configuration.

Each memory region may be capable of operating at different power states. In a typical DRAM memory device, read and write operations may be performed in a high power state, and the same operations may not be able to be performed while the memory device is in a low power state. Other devices may have different performance and different capabilities in various power states. For example, some devices may permit read operations in a low power state while not permitting write operations. In another example, some memory devices may permit read and write operations at a low power level but with a slower response time or different performance characteristics than when at a high power state.

In some memory technologies, a memory device may have more than two power states, each of which may allow different operations with respective performance characteristics.

Different techniques and architectures may be used to control when a memory region enters and exits a low power state. In some embodiments, a memory region may have a controller that monitors access to the memory region and lowers the power state when no access occurs within a period of time. When a request for a read or write operation is received, the controller may raise the power level to respond to the request. After a period of time without operations on the memory device, the controller may cause the memory device to enter a low power state. In many embodiments, such a controller may be a hardware component that may operate without external input.

Examples may include a memory controller 124 that may manage the power state of the memory region 108. In another example, a memory controller 126 may be a component or built in feature of a memory device 114. Still another example may be a memory controller that may be part of the processor 106.

In some embodiments, a memory controller may receive external input. For example, a memory manager may transmit a message or signal to the memory controller to enter a low power state. Such a communication may be transmitted as part of a read or write operation, or may be a separate communication.

A paging storage 123 may be a hard disk drive or other storage mechanism. The paging storage 123 may be used to store memory objects that are moved from main memory region, and may be a component in a virtual addressing scheme that permits more addressable memory space than physical memory.

In some embodiments, various power monitoring mechanisms may be present in the hardware. A power monitor mechanism may be capable of measuring energy consumption of a specific device or group of devices on an instantaneous, periodic, or other basis. The power monitoring mechanism may be used to determine energy consumption or energy savings when monitoring various operations and may be used as part of an optimization algorithm for memory object placement.

For example, a power monitor 128 may be capable of monitoring and measuring the energy consumption of memory devices 110 and 112. In some cases, the power monitor 128 may be capable of measuring the energy consumption of each memory device 110 and 112 individually or only as a collective group. Such a power monitoring device may be component of a power supply or power distribution system to the memory devices 110 and 112. In another example, the memory device 114 may include a power monitor 130 that may measure energy consumption for the memory device 114.

In still another example, a power monitor 132 may be a system-wide power monitoring system that may be capable of measuring energy consumption across the system. Depending on configuration, the power monitor 132 may be able to discriminate between and measure energy consumption for individual computer components, groups of components, memory devices, groups of memory devices, or other portions of a computer system.

The processor 106 may execute various components of software 104. The software components described in embodiment 100 are example components that may be used to manage objects in memory. Other embodiments may have different software configurations or may implement some of the functionality in hardware, for example.

In a typical computing system, an operating system 133 may perform many low level functions and various applications 138 may perform higher level functions. Typically, an operating system may act as a hardware interface for applications, and applications are computer programs that perform certain functions for a user. Operating systems often provide functions, such as memory management, networking, security, file systems, and other functions that are used by applications.

Applications 138 may create many different memory objects 140 that may be stored in the various memory devices within the hardware 102. The memory objects 140 may be as small as a single bit, or large databases containing many gigabytes or more of data. In some cases, a read or write operation to a memory object may involve reading or writing the entire memory object. In other cases, a read or write operation may involve reading or writing only a portion of the memory object.

A memory manager 134 may operate as part of an operating system 133 to manage memory locations to optimize energy consumption and performance. In other embodiments, some or all of the functions of the memory manager 134 may be an application 138, while still other embodiments may have some or all of the functions of the memory manager 134 as hardware components.

In many cases, the memory manager 134 may contain a performance monitor 144 that may assist in determining characteristics about the memory devices. For example, a performance monitor may test the latency during a read query then a memory device is in a low power state and when the memory device is in a high power state. The performance monitor may perform such tests as active test, where the performance monitor may configure a memory device in a particular state then perform a read or write operation and take measurements. In some embodiments, the performance monitor may operate passively and may monitor other applications' read and write queries to measure latency and other parameters.

The memory manager 134 may keep a mapping between virtual memory addresses and physical memory addresses. The mapping may allow applications to reference memory objects using the virtual addresses. When a memory object is moved from one memory region to another, the physical address may change in the mapping without affecting the virtual address.

The memory manager 134 may monitor memory objects stored within memory regions and may move memory objects to different memory regions to optimize energy usage.

The memory manager 134 may operate in several different architectures. Two different architectures are discussed here, but other architectures may also be used. In a first architecture, the memory manager 134 may monitor all memory objects contained in memory. Such a memory manager may optimize the placement by identifying memory regions for low frequency access memory objects and other memory regions for high frequency access memory objects, then the memory manager may consolidate less frequently used memory objects together, allowing those memory regions to be operated at low power states and thus conserving energy.

Such an architecture may evaluate all memory regions to select candidates for low power and high power states, then may move memory objects so that at least one memory region is operated at a low power state. Such an architecture may perform extensive optimization to tailor the memory object location for both performance and/or energy savings.

In another architecture, the memory manager 134 may monitor and manage memory objects in a subset of the memory regions. Such a memory manager may monitor a memory region to identify high frequency access memory objects, then move those memory objects to other memory regions. In this architecture, the memory manager may operate to remove those memory objects that may be causing a memory region to operate at higher power states.

A second architecture may monitor a smaller set of objects and may be capable of performing some optimization with less overhead and complexity than the first architecture. In one embodiment, a memory region may be identified in BIOS or another setup mechanism as a low power memory region. This selection may be kept constant while the computer system is operational and may or may not change.

The second architecture may identify only high frequency memory objects and move those objects to other memory regions. Some embodiments may additionally identify low frequency memory objects in other memory regions to be moved to the low frequency memory region.

The memory manager 134 may have a performance monitor 144 that may monitor the access of an object, as well as the performance of various memory regions. The performance metrics may be stored in a history database 148.

The access of a memory object may be monitored and characterized to identify the memory object for placement in an appropriate memory region. In some embodiments, the performance monitor 144 may track statistics for each memory region. In such an embodiment, each page of memory or each memory object may have a set of statistics that indicate access to the memory object. In other embodiments, the performance monitor 144 may monitor read and write operations and may identify those memory objects that have high access. In such an embodiment, separate statistics may or may not be kept for each memory object or memory page within memory.

When an embodiment identifies those objects with high access frequency, the remaining objects may be assumed to be low frequency access objects. Such an embodiment may keep fewer statistics and information about objects in memory.

The performance monitor 144 may also measure the latency, response time, throughput, or other performance parameters of a memory region. In such embodiments, the performance monitor 144 may store the actual performance characteristics of a memory region for use in optimization. Some such embodiments may measure performance characteristics of a system before and after implementing an optimized location of various memory objects. Such measurements may be used to verify that an optimized location is performing as expected and, in the case that the new location does not perform as well as the previous setting, may be used to revert to the previous location.

The memory manager 134 may have an optimizer 142 that may identify and optimize placement for memory objects and cause those memory objects to be moved according to an optimized placement. The optimizer 142 may use different input information to perform an optimization. In some embodiments, the history database 148 may be consulted to identify high frequency or low frequency access memory objects.

Some embodiments may include indicators from various applications 138 that may identify specific memory objects that will have higher or lower access. For example, an application may be changing operational states from an active mode to a sleep or dormant mode. When such a change occurs, the application 138 may communicate directly or indirectly with the memory manager 134 and the optimizer 142 to move memory objects associated with the application to an appropriate memory region.

Some memory managers 134 may have a power monitor 146. The power monitor 146 may be used to gather actual energy consumption data while a memory region is in its various power states. The power monitor 146 may interface with and communicate with various hardware power monitors 128, 130, and 132.

In some embodiments, the memory manager 134 may use the power monitor 146 to calculate an energy savings. In one such embodiment, the memory manager 134 may measure energy consumption of a memory device while in a low power state and again when the memory device is in a high power state. The difference between the energy consumption multiplied by the length of time the device is in the low power state may be calculated to be the approximate energy savings.

Some embodiments may verify performance and energy savings after implementing a change. Such embodiments may measure performance and power both before and after moving memory objects to different memory regions, and if adequate performance or energy savings are not achieved, may revert to the previous configuration.

A placement manger 143 may determine where memory objects may be stored, and may identify a temporary or long term memory region based on the object's characteristics. The placement manager 143 may gather metadata from various sources to classify a memory object, and use various techniques to identify a memory region in which to store the memory object. The placement manager 143 may use a set of policies 145 to balance performance goals against energy savings goals.

The policies 145 may define the relative importance of performance and energy savings for a device, and may be defined separately for specific applications, types of applications, processes, memory object types, or other classifications. In many instances, a memory object may be placed to optimize performance but with a energy consumption cost. Likewise, the same memory object may be placed to optimize energy consumption with a performance cost. The policies 145 may define such a tradeoff either expressly or implicitly. An express definition may include numerical or qualitative description of an optimization. An implied definition may have the tradeoff built into a procedure, workflow, or other algorithm.

In some embodiments, the policies 145 may change from time to time. For example, a server system used for a business may have the policies 145 configured for performance maximization during business hours, but may have the policies 145 configured for energy savings during non-business hours. In another embodiment, a device operating on battery power may have policies 145 configured for energy savings when the device operates on battery power, but may have the policies 145 configured for performance optimization when operating on external power.

The placement manager 143 may determine in which memory region a memory object may be placed. Examples of how a placement manager 143 may perform such an operation may be found in embodiments 300, 400, and 500 presented later in this specification.

In some embodiments, a BIOS 150 may be used to configure the hardware 102 prior to bootstrapping an operating system 133. The BIOS 150 may be used to configure the various memory regions. In some embodiments, a BIOS 150 setting may be used to identify some memory regions as interleaved as well as to identify specific memory regions as candidates for low power state operation. In some embodiments, Unified Extensible Firmware Interface (UEFI) or other technology may be used to configure one or more low level hardware or firmware configurations.

The BIOS 150 may also include a startup test procedure 152. The startup test procedure 152 may perform performance measurements of various memory regions. The startup test procedure 152 may cycle through each memory region and perform a read and write operation while the memory region is in a high power state and again while the memory region is in a low power state. Each memory region may be tested in this manner and the performance of the memory regions may be stored for use by an optimizing algorithm or routine.

The device of embodiment 100 is illustrated with a single processor 106. Other embodiments may have multiple processors. In multiple processor environments, certain memory devices may be directly accessible by certain processors, but only indirectly accessible by other processors. One example of such an architecture may be a Non-Uniform Memory Architecture (NUMA).

FIG. 2 is a diagram illustration of an embodiment 200 showing a power verses time chart for a memory device or memory region. Embodiment 200 is not to scale, but is used to illustrate general energy consumption and performance concepts that may reflect the actual operation of many different memory technologies.

The illustration of embodiment 200 is an example of a typical DRAM memory device. Other devices may have different energy consumption characteristics.

Embodiment 200 illustrates power draw 204 with respect to time 202. A curve representing power draw 206 is shown.

At the beginning of the curve, a high power state 208 is shown. At time 210, a read or write operation may be started, and the operation may end at time 214. During the operation the memory device may draw a higher level of power indicated by area 212. After the operation, the device may remain at the high power state 208.

The operations until time 214 illustrate a typical read or write operation while a memory device is in a high power state 208. During such an operation, a latency 216 may reflect the time between receiving a command and responding to it, as illustrated by time period 210 through 214.

In many embodiments, a memory controller may monitor a memory device that is at a high power state 208 and may cause the device to enter a low power state 224 at time 218. Many such embodiments may wait for a predetermined amount of time of no activity, illustrated as time period 220, before entering a low power state 224.

When a typical memory device is in a low power state 224, the device may not be able to respond to read or write requests. Some memory devices may be able to perform some operations at a low power state 224 while other operations may be only performed at a high power state 208.

At time 226, a read or write operation may be received. Because the device is in a low power state 224, the device may draw a higher power level 228 during a turn on period 227. After the turn on period 227, the device may process the operation during time period 224 and return to a high power state 208 at time 230.

Because the device was at a low power state 224 when a read or write operation was received at time 226, the latency 232 for responding to the request may be considerably longer than the latency 216 when the device was at a high power state 208. The increased latency 232 may be a performance factor that is encountered when a device is operated in a low power state.

Figure 3:
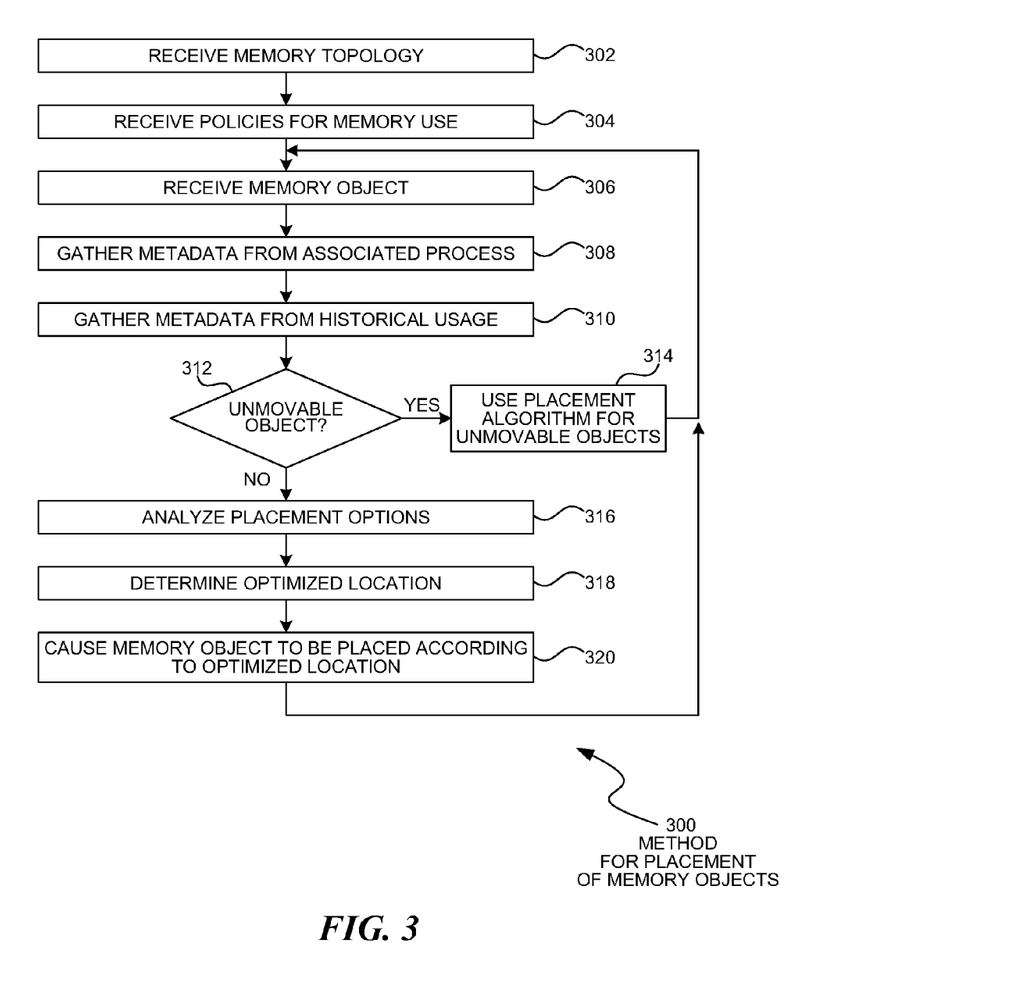
FIG. 3 is a flowchart illustration of an embodiment showing a method for placement of memory objects.

FIG. 3 is a flowchart illustration of an embodiment 300 showing a method placing memory objects. Embodiment 300 is a simplified example of a method that may be performed by a placement manager, such as the placement manager 143 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operation in a simplified form.

Embodiment 300 illustrates one method by which a placement manager may determine a memory region for a particular memory object. The method uses various metadata, policies, and memory topology to determine an optimized placement. The method also has a separate process for placement of unmovable objects.

The method of embodiment 300 may begin with receiving a memory topology in block 302 and polices for memory use in block 304.

The operations of blocks 302 and 304 may be performed during an initial startup of a device, and the memory topology and policies may be consistent while the device is operating. Some embodiments may allow for updating or changing the memory topology and policies during device operation. Such updates or changes may cause the memory placement process to operate differently afterwards.

The memory topology of block 302 may define the available memory devices, their connections, and their various characteristics. In many embodiments, some memory settings may be a configuration that is determined at the initial startup of a device and may not be changed once the device has been bootstrapped. In some embodiments, certain memory devices may be added, removed, or reconfigured after the device has begun operation.

The memory topology may include many different parameters and classifications for the memory regions. The parameters may include performance characteristics, including latency, time to go to a low power mode, time to go to a high power mode, energy consumption for various operations, response time, bandwidth, and other characteristics.

In some embodiments, the memory topology may be homogenous. A homogenous configuration may be to have several memory devices each with the same characteristics.

A non-homogenous configuration may have one or more devices configured differently or having different characteristics. In one example, a device may have four memory devices that are each in a separately controllable power region, but may have two memory devices that are configured as striped or interleaved. The two interleaved memory devices may be considered a single memory region and may be designated a high performance region, while the remaining two memory regions may be designated as normal performance regions.

In some embodiments, certain memory devices may have faster response time, larger bandwidth, redundancy, error checking, or other features that may designate those devices as high performance memory devices.

The policies in block 304 may define how the process of embodiment 300 will determine a placement for a memory object. In selecting an appropriate memory region for a memory object, the policies may balance energy consumption, performance, or other factors.

A memory object may be received in block 306 to place in memory. The memory object of block 306 may come from several sources and be of several different types.

The memory object may be an executable object. Such an object may be loaded into memory when an application is launched, or on demand when the memory object is requested from another executing code. In some embodiments, a runtime manager may load and unload executable components into and out of memory while an application is running.

Another type of executable object may be paged memory objects that have been stored in paging memory, but are being recalled into memory for use when requested by an executing process.

The memory objects may be data storage objects. In some cases, the data storage objects may be objects that are used by executing code for storing long term or temporary information. In some cases, the memory objects may be ranges of addresses assigned to certain devices or processes. Such memory objects may be unmovable objects because a memory manager may not be capable of moving the objects to other memory regions.

In blocks 308 and 310, metadata may be gathered from an associated process and from historical usage, respectively. The metadata may be used to characterize or classify the memory object for placement. The characterization may be used to determine if the memory object might be placed in a high performance memory region, a frequently accessed memory region, or an infrequently accessed memory region, for example.

A process associated with the memory object may provide some metadata about the memory object in block 308. The metadata may be expressly defined, such as when a process identifies the memory object as temporary, long term, high frequency access, low frequency access, or other parameters. In some cases, the metadata of block 308 may be implied. For example, the metadata may include a priority for a process associated with the memory object and other characteristics of the process or activity. In another example, the metadata may include a data type stored in the memory object.

The historical usage of the memory object in block 310 may be gathered from actual usage of the specific object or from similar memory objects. Actual usage may be found when a memory object is being returned to random access memory from paged storage, for example. The historical usage may be inferred from similar memory objects, such as other objects created by the same process, other objects of the same data type, or other characteristics.

Figure 4:
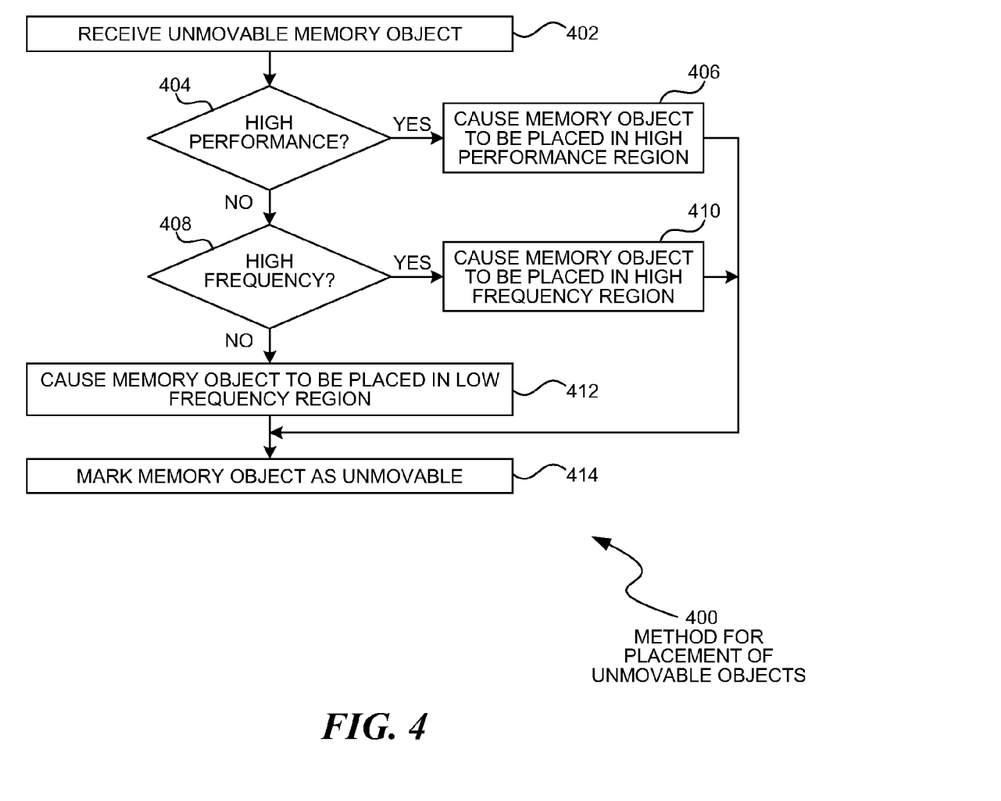
FIG. 4 is a flowchart illustration of an embodiment showing a method for placement of unmovable objects.

If the memory object is an unmovable object in block 312, a placement algorithm for unmovable objects may be used in block 314. An example of such an algorithm may be found in embodiment 400 presented later in this specification.

If the memory object is a movable object in block 312, the process of embodiment 300 may find an optimized placement in blocks 316 and 318, then cause the memory object to be placed in an appropriate memory region in block 320.

Figure 5:
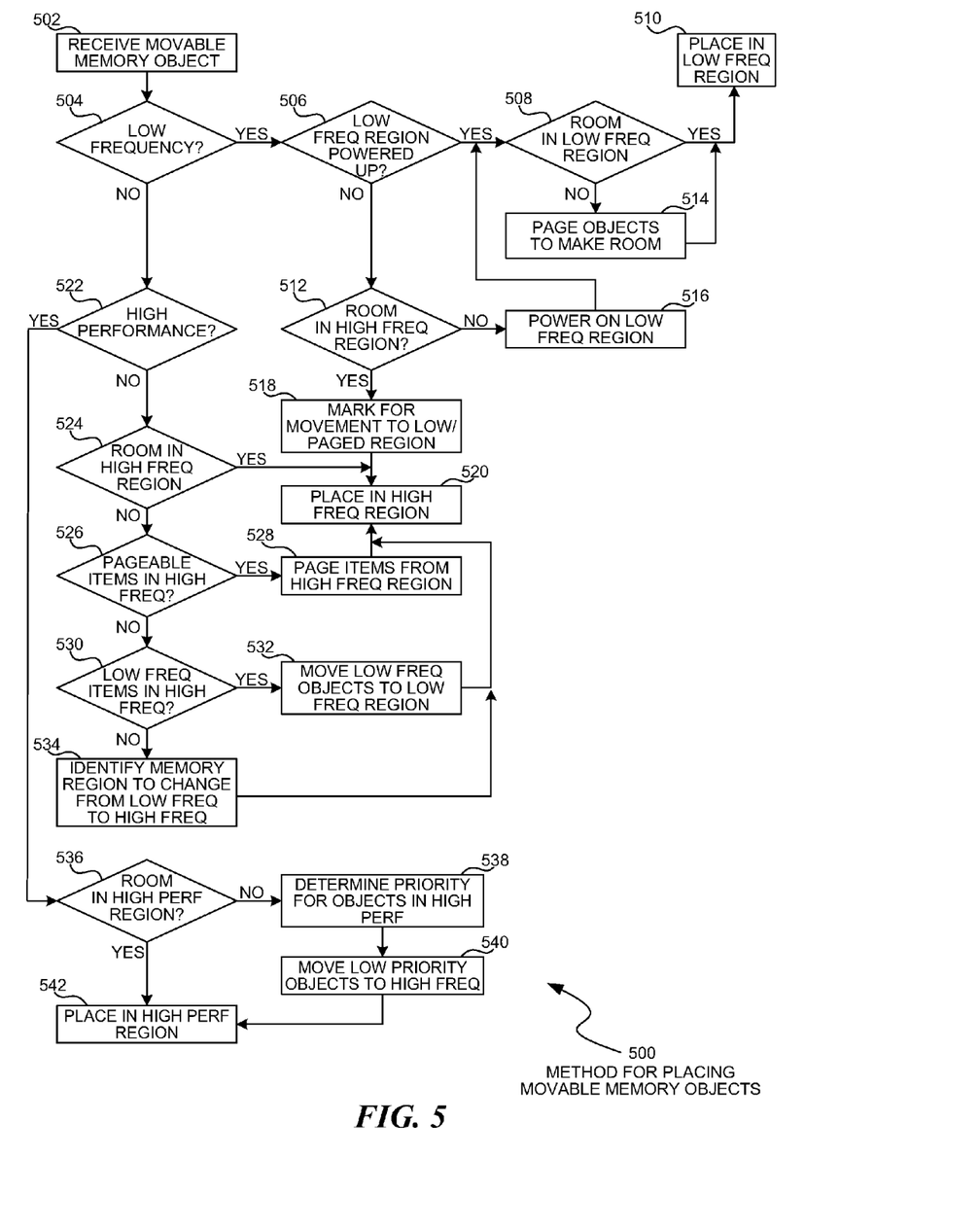
FIG. 5 is a flowchart illustration of an embodiment showing a method for placing movable memory objects.

An optimized placement may be determined by first analyzing placement options in block 316 and selecting an optimized placement in block 318. In block 316, multiple proposed locations may be determined, and in block 318, each location may be analyzed in terms of performance, energy savings, or other parameters and an optimized solution may be determined The method of blocks 316 and 318 is merely one method for determining a memory region in which to place a memory object. Embodiment 500 presented later in this specification is another mechanism that uses a predefined workflow to determine a placement.

The placement options of block 316 may include determining any placement for a memory object, including placing high performance or high frequency access memory objects in low frequency memory regions, or placing low frequency memory objects in high performance or high frequency access memory regions.

In many cases, a placement option may include performing several operations in order to store a first memory object. For example, a placement into a memory region that does not have enough room for the memory object may include moving some objects to paging storage, or moving some objects to other memory regions and then moving the initial memory object into the target memory region. In some embodiments, the placement options may include moving multiple memory objects to various memory regions, paging regions, or other locations.

Each placement option may be evaluated in block 318 to determine an optimized configuration. When a placement option is evaluated, the performance of each affected memory object and the associated processes may be evaluated, along with the energy costs of the placement option.

In some cases, the performance may be evaluated in terms of short term performance and long term performance. Consider the situation where a memory object may be placed in a high performance memory region that is full. In the short term, the memory object may be accessed with considerable latency because other objects may be moved from the high performance memory region to other memory regions. However, the memory object may be accessed repeatedly at a higher speed over the long term.

The placement options may be considered in conjunction with a memory optimization that may occur after the placement of the memory object. For example, a low frequency memory object may be placed in a high frequency memory region so that the memory object may be accessed, but may be moved to a low frequency memory region when the accessing has been completed.

In one such scenario, a memory object may be expected to be a low frequency memory object. However, when placing the memory object, a low frequency memory region may be in a low power state but a high frequency memory region may have room to store the memory object. If the memory object were placed in the low frequency memory region, the low frequency memory region may be raised to a high power state in order to receive the memory object and while the memory object is being accessed. The low frequency memory region may then be placed in a low power state when the access has completed. FIG. 2 gave an example of how these transitions between low and high power states may cause additional power draw. In such a scenario, the high frequency memory region may be a temporary location for a memory object that may have a lower energy consumption with a higher performance than if the memory object were placed directly into the low frequency memory region.

Figure 6:
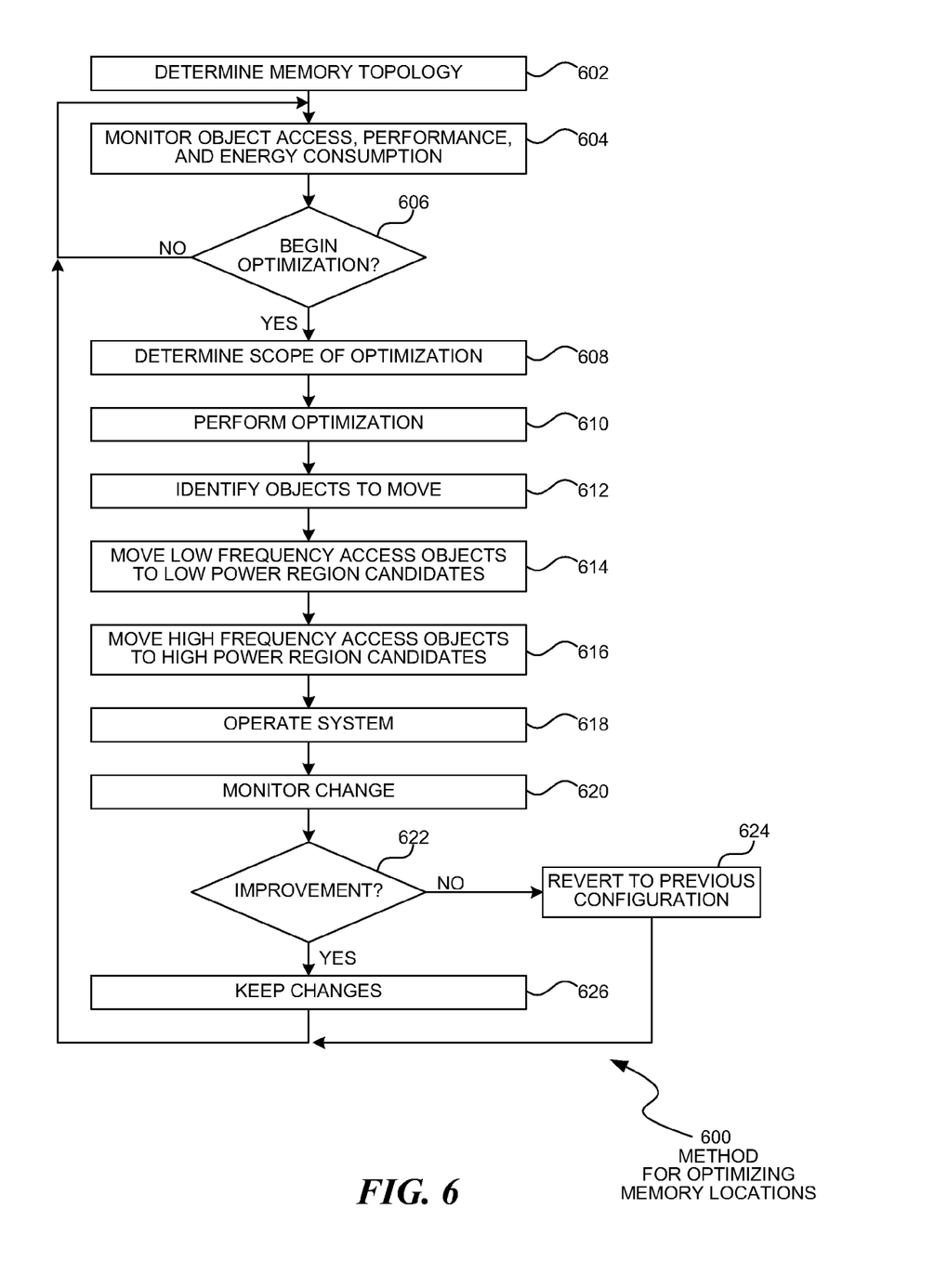
FIG. 6 is a flowchart illustration of an embodiment showing a method for optimizing memory objects within memory regions.

After each placement option is created in block 316 and an optimized placement is determined in block 318, the memory object may be placed in block 320. Once the memory object is placed in memory in block 320, other processes such as the optimization process of embodiment 600 may be used to manage the memory object.

FIG. 4 is a flowchart illustration of an embodiment 400 showing a method determining placement of unmovable memory objects. Embodiment 400 is a simplified example of a method that may be performed in the block 314 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a method by which unmovable memory objects may be placed in appropriate memory regions. The selection of a memory region may for an unmovable memory object may have impact in future optimization processes, as the unmovable memory objects may determine the characteristics of the memory regions in which they are placed.

In many optimization mechanisms, a memory region may be changed from a high power region to a low power region as memory objects are consolidated according to the type of memory object. When a memory region contains an unmovable memory object, that memory region may not easily be repurposed into another type of memory region. For this reason, it may be advantageous to minimize the number of memory regions containing unmovable memory objects in order to maintain a high level of flexibility in dynamically determining which memory regions are high power and which memory regions are low power.

The unmovable memory object may be received in block 402. When an unmovable memory object is received in block 402, metadata may also be received that may indicate the process or device that uses the memory object, priorities of the memory object and associated processes, and other characteristics. These metadata may be used to classify the unmovable memory object and determine which type of memory region is appropriate for the memory object.

If the memory object is a high performance memory object in block 404, the memory object may be placed in a high performance memory region in block 406 and marked as an unmovable memory object in block 414.

Similarly, if the memory object is a high access frequency memory object in block 408, the memory object may be placed in a high performance memory region in block 410 and marked as an unmovable memory object in block 414.

If the memory object is neither a high performance memory object in block 404 nor a high access frequency memory object in block 408, the memory object may be placed in a low access frequency region in block 412 and marked as an unmovable memory object in block 414.

FIG. 5 is a flowchart illustration of an embodiment 500 showing a method for placing memory objects. Embodiment 500 is a simplified example of a logic that may be used to place memory objects.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is an example of a different method for determining a memory region for a memory objects than the process discussed in blocks 316 and 318 of embodiment 300. Embodiment 500 may contain a set of logic, heuristics, or workflow for determining an optimized memory region for a memory object.

In many cases, the process of embodiment 500 may produce similar results as the process of blocks 316 and 318 of embodiment 300. In some cases, however, the process of blocks 316 and 318 may provide a more highly optimized solution, since the process of blocks 316 and 318 may include a wider range of placement scenarios. The process of blocks 316 and 318 may use more computational power than the process of embodiment 500, however.

The logic of embodiment 500 considers the case of a memory object being classified as a low frequency memory object, a high frequency memory object, or a high performance memory object. Similarly, embodiment 500 considers three types of memory regions: low frequency regions, high frequency regions, and high performance regions. A low frequency region may be one in which the power level is often operated in a low state. A high frequency region may be on in which the power level is operated in a high power state. A high performance region may be one in which is operated at a high power level and may be interleaved or have some other high performance characteristics.

Other embodiments may have more complex power level and access frequency characteristics and may have a more complex logic than is presented in embodiment 500. Embodiment 500 is merely one example of a simple embodiment to illustrate a logic that may be used.

The memory object may be received in block 502. When a memory object is received in block 502, metadata may also be received that may indicate the process or device that uses the memory object, priorities of the memory object and associated processes, and other characteristics. These metadata may be used to classify the memory object and determine which type of memory region is appropriate for the memory object.

If the memory object is a low frequency object in block 504, and a low frequency memory region is powered up in block 506, and there is room for the memory object in block 508, the memory object may be placed in the low frequency memory region in block 510.

If the low frequency region is full in block 508, objects from the low frequency region may be moved to a paged storage region in block 514 to make room for the memory object. Then, the memory object may be placed in the low frequency region in block 510.

If the low frequency region is not powered up in block 506, but no room exists in a high frequency region in block 512, the low power region may be powered on in block 516 and the process may continue with block 510. If there is room in a high frequency region in block 512, the memory object may be marked for movement to a low or paged region in block 518 and placed in a high frequency region in block 520.

When the low frequency memory object is placed in the high frequency memory region in block 520, the placement may be a temporary placement. Once the accessing has completed for the memory object, an optimization process, such as the optimization process in embodiment 600, may be used to move the memory object to a low frequency region.

If the memory object is not a low frequency object in block 504, the memory object may be considered either a high performance memory object or a high frequency memory object. If the memory object is not a high performance memory object in block 522, the memory object may be considered a high frequency memory object.

If there is room in a high frequency memory region in block 524, the object may be placed in the high frequency memory region in block 520.

If there is not sufficient room in the high frequency memory region in block 524, but there are memory objects that are ready to be moved to a paged memory location in block 526, the memory objects may be paged out in block 528 to make room for the new memory object which may be stored in a high frequency memory region in block 520.

Similarly, if there is not sufficient room in the high frequency memory region in block 524, but there are low frequency memory objects that are ready to be moved to low frequency memory regions in block 530, the memory objects may be moved to low frequency memory regions in block 532 and the memory object may be stored in a high frequency memory region in block 520.

If there is insufficient room in block 524 and there are no memory objects to move to paged memory in block 526 and no low frequency objects in block 530, a memory region may be identified in block 534 to change from low frequency access to high frequency access. After changing the memory region in block 534, the object may be placed in a high frequency memory region in block 520.

If the memory object is a high performance memory object in block 522, and there is room in high performance memory in block 536, the memory object may be stored in a high performance memory region in block 542. If the high performance memory region is full in block 536, a priority may be assigned to the current objects in high performance memory in block 538. The lower priority objects in high performance memory may be reclassified as high frequency memory object and placed in high frequency memory in block 540. In many embodiments, the process used by block 540 may be the process of embodiment 500. Such an embodiment may use the process of embodiment 500 recursively to place all memory objects. After the process of block 540, the memory object may be place in high frequency memory in block 542.

Embodiment 500 is merely one example of a workflow or rule definition for a policy for determining a placement for a memory object. Once the object is placed in memory, the subsequent movement of the memory object may be performed by embodiment 600.

FIG. 6 is a flowchart illustration of an embodiment 600 showing a method for managing memory objects. Embodiment 600 is a simplified example of a method that may be performed by a memory manager, such as the memory manager 134 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates an optimization method that may be performed by a memory manager. The method of embodiment 600 is merely one example of a method that may be used to operate some memory regions in a low power mode with a minimum of performance degradation.

The optimization of embodiment 600 may relocate various memory objects so that energy savings and performance may be optimized. By locating infrequently used memory objects together in a common memory region, the memory region may be operated in a low power state. In some embodiments, an optimization algorithm may perform a tradeoff between energy savings and performance characteristics, and the optimization algorithm may be variable such that a user may be able to select weighting factors for energy savings or performance.

An optimization algorithm may be any type of heuristic, process, or mechanism used to determine memory object placement. In some embodiments, a simple heuristic may be used, while other embodiments may perform a complex optimization by evaluating many different placement scenarios and selecting one of the scenarios. In many such optimizations, a performance cost and/or energy cost may be calculated for each scenario, along with a projected benefit in terms of energy savings or performance benefit, if any. Still other embodiments may use other optimization mechanisms.

In block 602, the memory topology may be determined. The memory topology may include identifying each memory region and various characteristics of the memory region. The characteristics may vary between different embodiments, and may include the size and performance characteristics of the memory region, the address space occupied by each memory region, mechanisms used to control the memory region, and other factors.

The memory topology may include a definition and configuration of memory banks, memory ranks, specific DIMMs, memory channels, memory circuits, integrated circuit devices, power rails or controls for memory regions, and other elements that define memory configuration. The definition of a memory topology may be different for various embodiments, and may be tailored to the type of optimization and level of control that a memory manager may have within a device. In some cases, a memory manager may be capable of managing memory objects at a precise level of control, such as being capable of identifying specific memory circuits in which a memory object may be stored. In other cases, a memory manager may have a more coarse level of control.

In some embodiments, different memory regions may have different performance characteristics, and those performance characteristics may be used to optimize memory object placement. For example, if a memory region consists of two interleaved DIMM memory devices, that memory region may have a higher response time and better throughput than other memory regions that have non-interleaved DIMM memory. Consequently, the memory region containing the interleaved DIMM memory devices may be considered as a candidate for highly accessed memory objects while the other memory regions may be candidates for low power state operation and infrequently accessed memory objects.

The memory topology may include mechanisms for a memory manager to control the memory region. Such mechanisms may include a messaging or communication mechanism by which a memory manager may request a memory region to operate in a high power or low power state.

In some embodiments, the topology determined in block 602 may be determined during a BIOS or bootstrap operation that may occur before or at the beginning of loading and executing an operating system. The topology may be determined by a BIOS level or operating system level routine that may detect each memory region, perform a query, and gather topology information.

In some such embodiments, a performance test may be made on each of the memory regions to determine performance metrics for the memory regions. Such a test may involve setting the memory region to a low power state and measuring the latency of a read or write request to the memory region, and also performing a similar test when the memory region is set to a high power state.

In block 604, memory objects may be monitored for access frequency, performance, and energy consumption. Block 604 may include many different monitored factors that may be used by an optimization routine.

If an optimization is not performed in block 606, the process may return to block 604 to generate a history of access frequency and other factors. In some embodiments, the performance and energy consumption may change with the workload of the device and the data stored in memory. In such embodiments, performance and energy consumption data may be collected and stored for individual memory objects or groups of memory objects.

The optimization in block 606 may be triggered by different mechanisms in different embodiments.

In some embodiments, an optimization may be performed on a periodic basis, such as every few minutes, every hour, every day, or some other predetermined basis. In such embodiments, a timer or other mechanism may launch an optimization in block 606.

In some embodiments, a device operates for long periods of time, such as servers or other computers that may operate continually for many days, weeks, or months. Such devices often have regular periods where the load on the device fluctuates. Often, these periods are predictable. For example, a server used by a business may be busy during normal business hours, but may be used lightly at night and during non-business hours. Such a server may perform some operations at night, such as backup operations for example. Such a server may have predictable times when the usage of the device may change, and an optimization may be performed prior to or just after the usage may change.

In such embodiments, a performance monitor may monitor the periodic usage of the device and may predict when an optimization may be performed based on the past history of the device.

In some embodiments, a change in an application may indicate that an optimization may be performed. A performance monitor may monitor specific applications or general computational activity on a device and may determine that one or more applications have increased or decreased activity. Based on the change in activity, an optimization may be performed.

Some embodiments may trigger an optimization based on direct notification from an application. For example, an application that has been triggered to come out of a sleep mode and perform extensive calculations may send an alert, trigger, or other indicator to a memory manager to optimize the memory locations based on the application's change of status.

In block 608, the scope of the optimization may be determined. In some embodiments, an optimization may be performed for a specific memory region, memory objects having specific characteristics, or other scopes.

In some cases, an optimization may be performed on all memory regions and may consider all memory objects. In such embodiments, an optimization in block 610 may analyze usage history for all memory objects, identify high and low frequency usage memory objects, identify memory regions for those memory objects, and move the memory objects to the respective memory regions. In many cases, such an optimization may evaluate many different placement scenarios and may select an optimized placement scenario based on performance and power factors.

In some such embodiments, several groups of memory regions may be identified for memory objects with similar usage frequency. In some cases, memory objects may be consolidated in memory regions based on usage frequency metrics that are independent of other memory objects. In some cases, memory objects may be consolidated into memory regions where the usage frequency correlates with other memory objects. For example, several memory objects may have similar usage patterns where the objects are frequently used at the same time but may be dormant at the same time. Such objects may be consolidated into the same memory region to maximize energy savings. In some embodiments, such memory objects may be related to a single application and may be identified by their relationship to the application. In other embodiments, the usage history of the memory objects may be compared to group memory objects that are highly and lightly used at the same time.

In some embodiments, an optimization may be performed for a specific type of data, or for data associated with a specific application. In such cases, the optimization of block 610 may consider only moving those memory objects having the designated type of data or that are associated with the designated application. Such optimization routines may identify memory regions for high and low power states and move memory objects accordingly.

In some embodiments, an optimization routine may operate by identifying highly accessed memory objects and grouping those memory objects in a designated memory region. Conversely, some embodiments may operate by identifying infrequently accessed memory objects and moving those objects to a memory region that may be often at a low power state. Such embodiments may identify memory objects from other memory regions to populate identified memory regions.

Other embodiments may use an optimization routine that examines a memory region to identify memory objects to move out of the memory region. For example, a designated highly accessed memory region may be analyzed to identify memory objects that are not highly accessed and may attempt to move those memory objects to other memory regions. In another example, a memory region designated as a low power state memory region may be analyzed to identify highly accessed memory objects in the memory region and the optimization routine may attempt to move those memory objects to other memory regions.

In embodiments where optimization is performed for a specific application or specific type of data, those memory objects may be analyzed to determine if the memory regions in which the memory objects are stored are appropriate for those objects. For example, such an optimization may identify various memory regions as highly accessed or lightly accessed, then compare the identified memory objects to determine if the usage history of the memory objects are compatible with the memory regions. Any incompatibility may be rectified by moving the incompatible memory objects to different memory regions.

Throughout this specification, optimization routines have been exemplified by designating memory regions or memory objects as being two classes: frequently accessed and infrequently accessed. Such a designation is used as a simplified way to describe the optimization, but is not intended to be limiting. In some embodiments, the access frequency of memory objects and memory regions may be grouped in two, three, four, or more levels or categories. For example, memory objects and memory regions may be grouped as high, medium, and low frequency categories.

In some embodiments, the type of access to a memory object may have an effect on performance and energy savings. In such embodiments, those memory objects having similar types of access may be grouped together in memory regions. For example, some embodiments may group memory objects together that are frequently accessed using read commands separately from memory objects that are frequently accessed using write commands. Some embodiments may group read-only data separately, in another example. Some embodiments may group memory objects by data type, such as Boolean data, string data, numerical data, or other complex data types, when such data types may be exposed to a memory manager. In another example, memory objects created by a certain application may be grouped together.

The optimization in block 610 may result in identification of objects to move in block 612, as well as identifying candidate memory regions for high frequency access and low frequency access. The low frequency access memory regions may be those that may be operated in a low power mode as often as possible. After identifying the memory objects to move, the low frequency access objects may be moved to low power regions in block 614 and high frequency access objects may be moved to high frequency access memory regions in block 616.

After the changes are implemented in blocks 614 and 616, the system may be operated in block 618. During the operation of block 618, those memory regions that have infrequently accessed memory objects may be operated in a low power state more often than before the changes of blocks 614 and 616. If such an improvement is found in block 622, the changes may be kept in block 626 and the process may return to block 604. If such an improvement is not detected in block 622, the changes may be reverted to a previous configuration in block 624 and the process may return to block 604.

Block 622 may examine the performance and energy savings of the optimization of block 610 and may determine if the optimization goals have been met. In some embodiments, the optimization goals may be purely energy savings, or may be a combination of energy savings and performance. If those goals are not met, the system may undo the changes in block 624.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a plurality of memory regions, at least one of said memory regions having at least a low power state and a high power state and operable in different power states separately and independently from other memory regions;
   a processor or memory manager configured to manage memory contents by a method comprising:
      receiving a first memory object to store in one of said plurality of memory regions;
      characterizing said first memory object to determine an anticipated usage pattern and operational characteristics;
      identify a first memory region in which to store said first memory object based on a policy defining rules by which said first memory object is placed in one of said plurality of memory regions based on said anticipated usage patterns and said operational characteristics; and
      causing said first memory object to be stored in said first memory region.

2. The system of claim 1, said characterizing being performed by identifying a type of memory object.

3. The system of claim 2, said type comprising one of a group composed of:
   high frequency access;
   low frequency access;
   unmovable object;
   short term object; and
   long term object.

4. The system of claim 2, said type comprising one of a group composed of:
   a paged object;
   a new database object; and
   an executable object.

5. The system of claim 2, said type being defined in part by metadata associated with said memory object.

6. The system of claim 5 further comprising:
   an object analyzer configured to determine said metadata about said memory object.

7. The system of claim 1, said policy comprising a set of conditions defining when to place objects in a low power region.

8. The system of claim 7, said set of conditions comprising a condition when said first memory region is full.

9. The system of claim 8, said method further comprising:
   determining that said first memory region has insufficient capacity to store said first memory object;
   identifying a second memory object in said first memory region to move to a paging storage; and
   causing said second memory object to be moved from said first memory region to said paging storage prior to causing said first memory object to be stored in said first memory region.

10. The system of claim 9, said method further comprising:
    changing said first memory region from a low power state to a high power state.

11. The system of claim 1, said policy comprising a set of conditions defining when to place objects in a high power region.

12. The system of claim 11, said method further comprising:
    determining that said first memory object is a low frequency memory object.

13. The system of claim 12, said method further comprising:
    causing said first memory object to be stored in said first memory region;
    determining that said first memory object has not been accessed in a predetermined time;
    identifying a second memory object in said first memory region;
    determining that said second memory object has not been accessed in said predetermined time;
    causing a second memory region to go from a low power state to a high power state; and
    moving said first object and said second object from said first memory region to said second memory region.

14. The system of claim 13 further comprising:
    moving a third object from said second memory region to a paging storage while said second memory region is on a high power state.

15. A method performed by a computer processor, said method comprising:
    receiving a first memory object to store in one of a plurality of memory regions;
    characterizing said first memory object to determine an anticipated usage pattern;
    determining operational characteristics for each of said memory regions, at least one of said memory regions being capable of operating at a low power state and a high power state;
    receiving a policy defining rules by which said memory objects are placed in said memory regions based on said anticipated usage patterns and said operational characteristics;
    identifying a first memory region in which to store said first memory object using said policy; and
    causing said first memory object to be stored in said first memory region.

16. The method of claim 15, said characterizing being determined by analyzing metadata about said first memory object.

17. The method of claim 15, further comprising:
    determining that said first memory object is being infrequently accessed; and
    causing said first memory object to be moved to a second memory region.

18. A system comprising:
    a plurality of memory regions, at least one of said memory regions having at least a low power state and a high power state and operable in different power states separately and independently from other memory regions;
    a memory manager for each of said memory regions having said at low power state and said high power state, said memory manager configured to change from said high power state to a low power state when no access to said memory region has been detected in a predetermined period of time;
    a processor configured to perform a method comprising:
       receiving a first memory object to store in one of a plurality of memory regions;
       characterizing said first memory object to determine an anticipated usage pattern;
       determining operational characteristics for each of said memory regions, at least one of said memory regions being capable of operating at a low power state and a high power state;

receiving a policy defining rules by which said memory objects are placed in said memory regions based on said anticipated usage patterns and said operational characteristics;

identifying a first memory region in which to store said first memory object using said policy, said first memory object having a low anticipated usage pattern and said first memory region having a high frequency access operational characteristic; and causing said first memory object to be stored in said first memory region.

19. The system of claim 18 said method further comprising:

causing said first memory object to be moved to a second memory region, said second memory region having a low frequency access operational characteristic.

20. The system of claim 19, said method further comprising:

causing a second object contained in said second memory region to be moved to a paging storage.

\* \* \* \* \*